US006888584B2

(12) United States Patent
Suzuki et al.

(10) Patent No.: US 6,888,584 B2
(45) Date of Patent: May 3, 2005

(54) LIQUID CRYSTAL DISPLAY DEVICE

(75) Inventors: Nobuyuki Suzuki, Mobara (JP); Ryoji Oritsuki, Shirako-machi (JP); Yasushi Nakano, Mobara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/798,329

(22) Filed: Mar. 12, 2004

(65) Prior Publication Data

US 2004/0169778 A1 Sep. 2, 2004

Related U.S. Application Data

(63) Continuation of application No. 09/973,775, filed on Oct. 11, 2001, now Pat. No. 6,710,824, which is a continuation of application No. 09/342,131, filed on Jun. 29, 1999, now Pat. No. 6,333,769.

(30) Foreign Application Priority Data

Jun. 29, 1998 (JP) ........................................... 10-183023

(51) Int. Cl.[7] ................................................ G02F 1/13
(52) U.S. Cl. ......................................................... 349/40
(58) Field of Search ............................................ 349/40

(56) References Cited

U.S. PATENT DOCUMENTS 5,068,748 A    11/1991  Ukai et al.
5,852,480 A  * 12/1998  Yajima et al. ................. 349/40
6,005,647 A  * 12/1999  Lim .............................. 349/40
6,184,948 B1 *  2/2001  Lee .............................. 349/54
6,191,837 B1    2/2001  Fujimaki et al.
RE38,292 E   * 10/2003  Satou .......................... 438/158

FOREIGN PATENT DOCUMENTS

JP         9-90428       4/1997
JP        10-10494       1/1998

* cited by examiner

Primary Examiner—James A. Dudek
(74) Attorney, Agent, or Firm—Antonelli, Terry, Stout & Kraus, LLP

(57) ABSTRACT

A liquid crystal display device having a first substrate, a second substrate, a liquid crystal layer interposed between the first substrate and the second substrate, a plurality of video signal lines and scanning signal lines formed on the first substrate, and defining pixel regions, a thin film transistor formed in the pixel regions, and driven by a scanning signal from the scanning signal line for supplying video signal from one of the video signal lines to a pixel electrode and a display area containing a plurality of the pixel regions. A first protection element line formed at a peripheral portion of the display area, and being connected to a odd-numbered ones of the video signal lines by first high-resistance elements, and a second protection element line formed at a peripheral portion of the display area, and being connected to even-numbered ones of the video signal lines by second high-resistance elements.

8 Claims, 4 Drawing Sheets

LIQUID CRYSTAL DISPLAY DEVICE

CROSS-REFERENCE TO RELATED APPLICATION

This application is a continuation of U.S. application Ser. No. 09/973,775, filed Oct. 11, 2001, now U.S. Pat. No. 6,710,824, which is a continuation of application Ser. No. 09/342,131 filed on Jun. 29, 1999, now U.S. Pat. No. 6,333,769, the contents of which are incorporated herein by reference in their entirety.

BACKGROUND OF THE INVENTION

The present invention relates to a liquid crystal display device; and, more specifically, the invention relates to an in-plane field type liquid crystal display device.

In general, an in-plane field type liquid crystal display device is provided with a pixel electrode and a counter electrode spaced apart from the pixel electrode in each pixel area on a liquid-crystal-side surface of one of the transparent substrates which are opposed to each other via a liquid crystal, and the optical transmittance of the liquid crystal is controlled by means of an electric field which is selectively generated between the pixel electrode and the counter electrode.

A liquid crystal display device of an active matrix type which adopts the in-plane field mode of operation includes, on a liquid-crystal-side surface of one of its transparent substrates, scanning signal lines extended in the x direction and juxtaposed in the y direction, counter signal lines extended in the x direction and juxtaposed in the y direction, and video signal lines extended in the y direction and juxtaposed in the x direction, and each area surrounded by adjacent scanning and counter signal lines and a pair of adjacent video signal lines is formed as a pixel area. In each pixel area, there is a thin-film transistor driven by the supply of a scanning signal from the scanning signal line and a pixel electrode to which a video signal is supplied from one of the video signal lines via the thin-film transistor. In this case, since a voltage corresponding to the video signal relative to the counter electrodes is applied to the pixel electrode, a reference voltage is applied to the counter electrode via the counter signal line.

In such a liquid crystal display device, since its structure is such that the thin-film transistors are easily damaged by static electricity, it is indispensable to take measures against static electricity. As an attempt at taking measures against static electricity, there has been a proposal in which a protection element common line is formed to surround a display area formed by an assembly of pixels, and scanning signal lines and video signal lines are connected to the protection element common line via non-linear elements at the intersections of the scanning and video signal lines and the protection element common line.

For example, a technique for taking measures against static electricity in a liquid crystal display device, which differs in structure from the in-plane field mode, is described in Japanese Patent Laid-Open No. 9-90428. In accordance with this technique, as measures against static electricity, scanning signal lines and video signal lines are connected to a common line via static protection elements. Although the static protection elements are formed of high-resistance elements so that static electricity flows through the static protection elements, the scanning signal lines and the video signal lines are electrically connected via the static protection elements and the common line. For this reason, it has been found, when the liquid crystal display device is being driven by an external circuit, part of the video signals from the video signal lines flow into the static protection elements as leakage current and this leakage current flows into the counter electrodes of the respective pixels via the common line, creating problems in that the image quality is degraded and the voltage at the video signal lines is lowered.

SUMMARY OF THE INVENTION

The present invention has been made to solve the above-described problems, and an object of the present invention is to provide a technique which is capable of avoiding the occurrence of damage due to static electricity in a liquid crystal display device of the in-plane field type, which is provided with pixel electrodes and counter electrodes on one substrate.

Another object of the present invention is to provide a liquid crystal display device which is capable of avoiding the occurrence of leakage current from scanning signal lines or video signal lines.

The above and other objects and novel features of the present invention will become apparent from the description given herein and the accompanying drawings. A representative aspect of the invention disclosed in the present application will be summarized below.

In a liquid crystal display device, pixel areas which are surrounded by scanning signal lines, video signal lines and counter signal lines are arranged on a liquid-crystal-side surface of one of the transparent substrates opposed to each other across a liquid crystal, and the respective pixel areas include thin-film transistors driven by the supply of scanning signals from the scanning signal lines, pixel electrodes to which video signals from the video signal lines are supplied via the respective thin-film transistors, and counter electrodes spaced apart from the pixel electrodes and connected to the counter signal lines. A common line is formed to surround a display area formed by an assembly of the pixel areas, and the video signal lines and the scanning signal lines are connected to the common line by non-linear elements at the intersections of the video and scanning signal lines and the common line. The common line is connected to the counter signal lines via high-resistance elements.

In the liquid crystal display device having the above-described construction, even if leakage current due to scanning or video signals flows via the non-linear elements, this leakage current can be prevented from flowing into the counter signal lines by the high-resistance elements.

DETAILED DESCRIPTION OF THE INVENTION

Embodiments of the liquid crystal display device according to the present invention will be described below with reference to the accompanying drawings.

Figure 2:
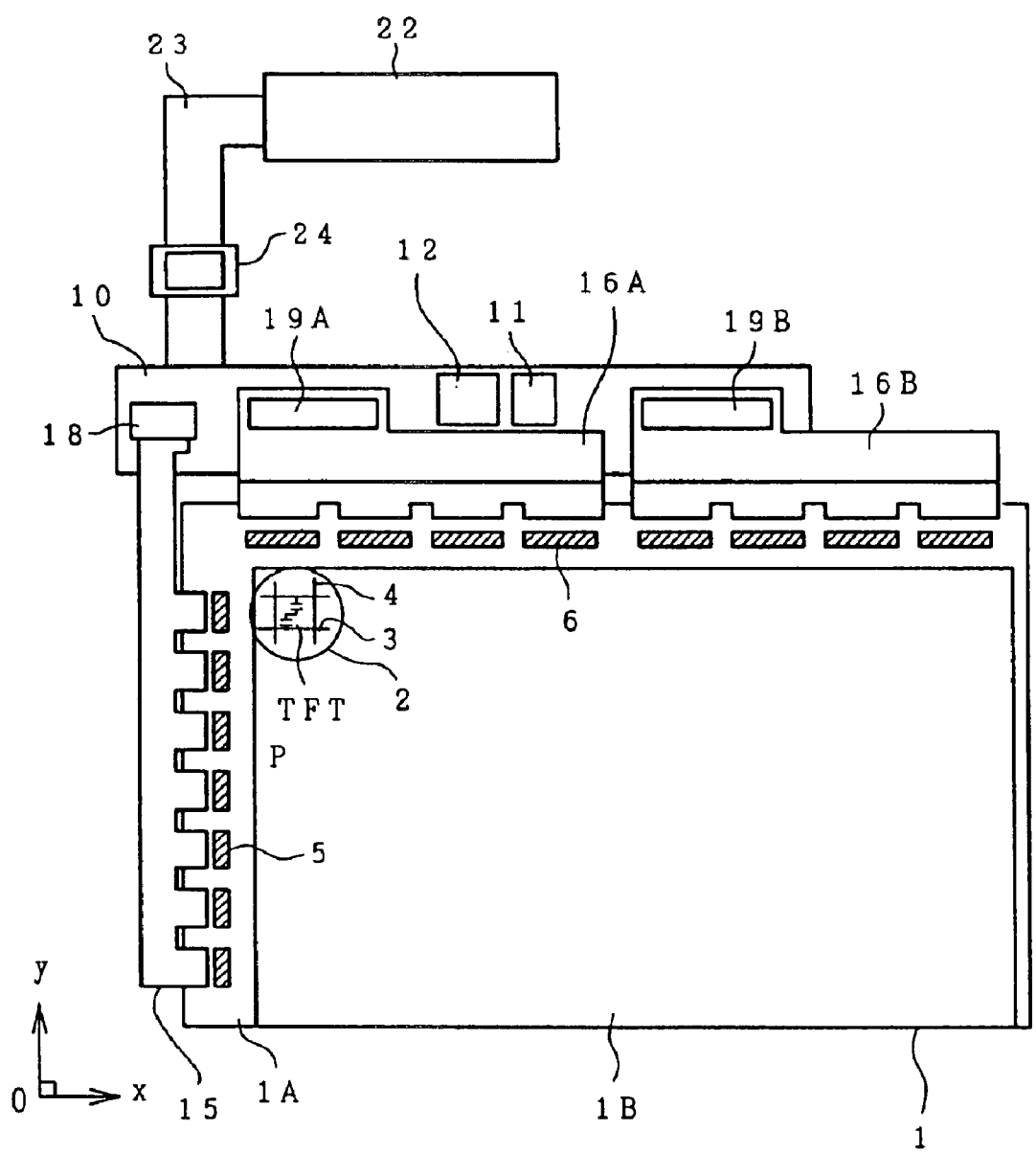
FIG. 2 is a schematic diagram showing the embodiment of the liquid crystal display device according to the present invention.

FIG. 2 is a schematic view showing the construction of the entire liquid crystal display device according to the present invention. In this embodiment, the present invention is applied to a liquid crystal display device which adopts a so-called in-plane field mode of operation, which is known to have a wide viewing angle.

A liquid crystal display panel 1 includes transparent substrates 1A and 1B which are arranged opposite to each other across a liquid crystal and serve as a package. One of these transparent substrates (the lower substrate shown in FIG. 2, i.e. a transparent matrix substrate 1A) is formed to be slightly larger than the other transparent substrate (the upper substrate shown in FIG. 2, i.e. a transparent color filter substrate 1B), and both transparent substrates are arranged to be nearly even with each other at their lower and right-hand edges, as viewed in FIG. 2. Accordingly, the transparent substrate 1A is extended outward of the transparent substrate 1B at its left-hand and upper edges, as viewed in FIG. 2. As will be described later in detail, this outward extended portion is an area in which gate driving circuits and drain driving circuits are mounted.

Pixels 2, which are arranged in a matrix array, are formed in an area in which the transparent substrates 1A and 1B are superimposed on each other. The pixels 2 are formed in areas, each of which is surrounded by adjacent ones of scanning signal lines 3, which are extended in the x direction and juxtaposed in the y direction, as viewed in FIG. 2, and adjacent ones of video signal lines 4, which are extended in the y direction and juxtaposed in the x direction. Each of the pixels 2 is provided with at least a switching element TFT, which is driven by the supply of a scanning signal from one of the adjacent scanning lines 3, and a pixel electrode to which a video signal supplied from one of the adjacent video signal lines 4 is applied via this switching element TFT.

As described above, each of the pixels 2 adopts the so-called horizontal electric field system, and, as will be described later in detail, is provided with a reference electrode and an additional capacitive element in addition to the above-mentioned switching element TFT and pixel electrode. Each of the scanning signal lines 3 is extended outward of the transparent substrate 1B at its one end (the left-hand end as viewed in FIG. 2) and is connected to the output terminal of a corresponding gate driving circuit (IC) 5 mounted on the transparent substrate 1A. In this construction, a plurality of gate driving circuits 5 are disposed along one edge of the substrate 1A, and the scanning signal lines 3 are grouped into pairs of adjacent lines and each of the grouped pairs is connected to a proximate one of the gate driving circuits 5.

Similarly, each of the video signal lines 4 is extended outward of the transparent substrate 1B at its one end (the upper end as viewed in FIG. 2) and is connected to the output terminal of a corresponding drain driving circuit (IC) 6 mounted on the transparent substrate 1A. In this construction, a plurality of drain driving circuits 6 are disposed along one edge of the substrate 1A, and the video signal lines 4 are grouped into pairs of adjacent lines and each of the grouped pairs is connected to a proximate one of the drain driving circuits 6.

A printed circuit board (control circuit board) 10 is arranged on the side of the liquid crystal display panel 1 on which the gate driving circuits 5 and the drain driving circuits 6 are mounted in the above-described manner, and a control circuit 12 for supplying input signals to the gate driving circuits 5 and the drain driving circuits 6 is mounted on the printed circuit board 10 in addition to a power supply circuit 11 and other circuits. Signals from the control circuit 12 are supplied to the gate driving circuits 5 and the drain driving circuits 6 via flexible printed wiring boards (a gate circuit board 15, a drain circuit board 16A and a drain circuit board 16B).

Specifically, a flexible printed wiring board (the gate circuit board 15) which is provided with terminals opposed and connected to the input terminals of the respective gate driving circuits 5 is arranged on the side of the gate driving circuits 5. A portion of the gate circuit board 15 is formed to extend toward the printed circuit board 10, and the extended portion is connected to the printed circuit board 10 via a connecting part 18. The output signals from the control circuit 12 mounted on the printed circuit board 10 are inputted to the respective gate driving circuits 5 via a wiring layer on the printed circuit board 10, the connecting part 18 and a wiring layer on the gate circuit board 15.

The drain circuit boards 16A and 16B, each of which is provided with terminals opposed and connected to the input terminals of the respective drain driving circuits 6, are arranged on the side of the drain driving circuits 6. Portions of the drain circuit boards 16A and 16B are formed to extend toward the printed circuit board 10, and the extended portions are connected to the printed circuit board 10 via connecting parts 19A and 19B, respectively. The output signals from the control circuit 12 mounted on the printed circuit board 10 are inputted to the drain circuit boards 16A and 16B via the wiring layer on the printed circuit board 10, the respective connecting parts 19A and 19B, and wiring layers on the respective drain circuit boards 16A and 16B.

The drain circuit boards 16A and 16B for the drain driving circuits 6 are provided as two separate circuit boards, as shown in FIG. 2. This is intended to prevent, for example, harmful effects caused by thermal expansion due to an increase in length in the x direction of FIG. 2 of either of the drain circuit boards 16A or 16B which accompanies an increase in the size of the liquid crystal display panel 1. The output signals from the control circuit 12 mounted on the printed circuit board 10 are inputted to the corresponding drain driving circuits 6 via the connecting part 19A of the drain circuit board 16A and the connecting part 19B of the drain circuit board 16B. In addition, a video signal is supplied from a video signal source 22 to the printed circuit board 10, through a cable 23 via an interface circuit board 24, and is inputted to the control circuit 12 mounted on the printed circuit board 10.

In FIG. 2, the liquid crystal display panel 1, the gate circuit board 15, the drain circuit boards 16A and 16B and the printed circuit board 10 are shown to be positioned in approximately the same plane. Actually, the printed circuit board 10 is bent at a portion where the gate circuit board 15 and the drain circuit boards 16A and 16B are mounted, and is positioned at approximately right angles to the liquid crystal display panel 1. This construction is intended to reduce the area of the so-called frame, which is the area between the outline of the outer edge of the liquid crystal display device and the outline of its display portion, and by reducing this frame area, it is possible to obtain the effect of increasing the area of the display portion with respect to the outer frame.

Figure 3:
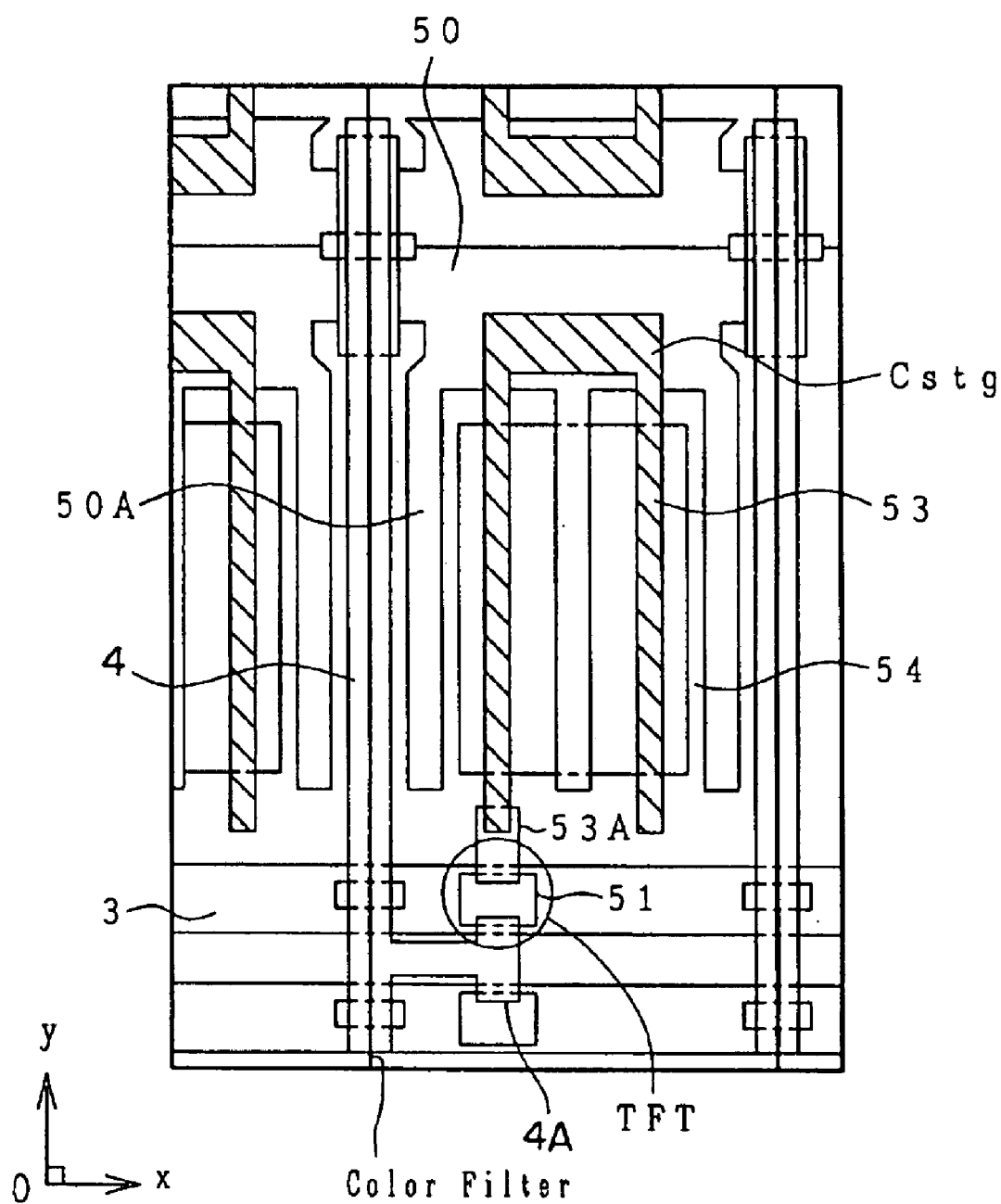
FIG. 3 is a plan view showing an example of the configuration of a pixel area of the liquid crystal display device according to the present invention.

FIG. 3 is a plan view showing in detail the construction of a pixel area. Referring to FIG. 3, the scanning signal line 3 and a counter signal line 50, which are extended in the x direction, are formed on a principal surface of the transparent substrate 1A. The area surrounded by each of these signal lines 3 and 50 and adjacent video signal lines 4 (to be described later), which are extended in the y direction, forms a pixel area. In other words, in this embodiment, the counter signal line 50 is formed to run between the scanning signal lines 3 in parallel with the same, and pixel areas are respectively formed to extend in the ±y directions from each counter signal line 50.

With this construction, it is possible to reduce the number of the counter signal lines 50 juxtaposed in the y direction to approximately half of the conventionally required number, whereby it is possible to assign the areas occupied by the counter signal lines 50 to the pixel areas and increase the total area of the pixel areas. In each of the pixel areas, for example, three counter electrodes 50A, which extend in the y direction, are formed at equal intervals integrally with a counter signal line 50. These counter electrodes 50A are not connected to, but extend to positions close to, the scanning signal line 3, and the outside two counter electrodes 50A are arranged adjacent to the respective video signal lines 4, and the remaining one counter electrode 50A is positioned in the center therebetween.

Furthermore, an insulation film made of, for example, silicon nitride is formed to cover the scanning signal lines 3, the counter signal lines 50 and the counter electrodes 50A, over the principal surface of the transparent substrate 1A on which the scanning signal lines 3 and others are formed in the above-described manner. This insulation film functions as an interlayer insulation film for insulating the video signal lines 4 from the scanning signal lines 3 and the counter signal line 50, and also functions as a gate insulation film for the thin-film transistor TFT and as a dielectric film for a storage capacitor Cstg.

On the surface of the insulation film, a semiconductor layer 51 is formed in an area in which the thin-film transistor TFT is formed. This semiconductor layer 51 is made of, for example, amorphous Si, and is formed to be superimposed on the scanning signal line 3 in a portion close to one of the video signal lines 4 which will be described later. Thus, part of the scanning signal line 3 serves as the gate electrode of the thin-film transistor TFT. The video signal lines 4, which are extended in the y direction and juxtaposed in the x direction, are formed on the surface of the insulation film. Each of the video signal lines 4 is integrally provided with a drain electrode 4A which is formed to extend into a portion of the surface of the semiconductor layer 51 which constitutes the thin-film transistor TFT.

Furthermore, a pixel electrode. 53, which is connected to a source electrode 53A of the thin-film transistor TFT, is formed on the surface of the insulation film in the pixel area. This pixel electrode 53 is formed to have respective portions which extend in the y direction in the center between respective pairs of the counter electrodes 50A. Specifically, one end of the pixel electrode 53 also serves as the source electrode 53A of the thin-film transistor TFT, and the pixel electrode 53 has a first portion which extends in the y direction toward the counter signal line 50, a second portion which extends in the x direction along the counter signal line 50, and a third portion which extends in the y direction, thereby forming a U-shape. The portion of the pixel electrode 53 which is superimposed on the counter signal line 50 constitutes a part of the storage capacitor Cstg, which uses the above-described insulation film as the dielectric film, in the region between the portion and the counter signal line 50. The storage capacitor Cstg serves to store video information in the pixel electrode 53 for a long time, for example, when the thin-film transistor TFT is off.

The surface of the semiconductor layer 51 which corresponds to the interface between the drain electrode 4A and the source electrode 53A of the thin-film transistor TFT is doped with phosphorus (P) to form a high-concentration layer, thereby providing ohmic contact at each of the drain electrode 4A and the source electrode 53A. The high-concentration layer is formed over the entire surface of the semiconductor layer 51, and after the drain electrodes 4A and the source electrodes 53A have been formed, these electrodes 4A and 53A are used as a mask to etch the portion of the high-concentration layer other than the area in which the electrodes 4A and 53A are formed, thereby forming the above-described construction.

Then, a protective film made of, for example, silicon nitride is formed over the insulation film on which the thin-film transistors TFT, the video signal lines 4, the pixel electrodes 53 and the storage capacitors Cstg are formed in the above-described manner, and an alignment film is formed over the protective film, to constitute the so called lower substrate of the liquid crystal display panel 1.

Although not shown, a black matrix (denoted by reference numeral 54 in FIG. 3), which has apertures in portions corresponding to the respective pixel areas, is formed in a liquid-crystal-side portion of the transparent substrate (color filter substrate) 1B which constitutes the so-called upper substrate. Furthermore, color filters are formed to cover the apertures formed in the portions of the black matrix 54 which correspond to the respective pixel areas. These color filters have colors which differ between adjacent pixel areas in the x direction, and the respective color filters have boundaries on the black matrix 54. A flat film made of resin or the like is formed over the surface on which the black matrix 54 and the color filters are formed in this manner, and an alignment film is formed over the surface of the flat film.

Figure 1:
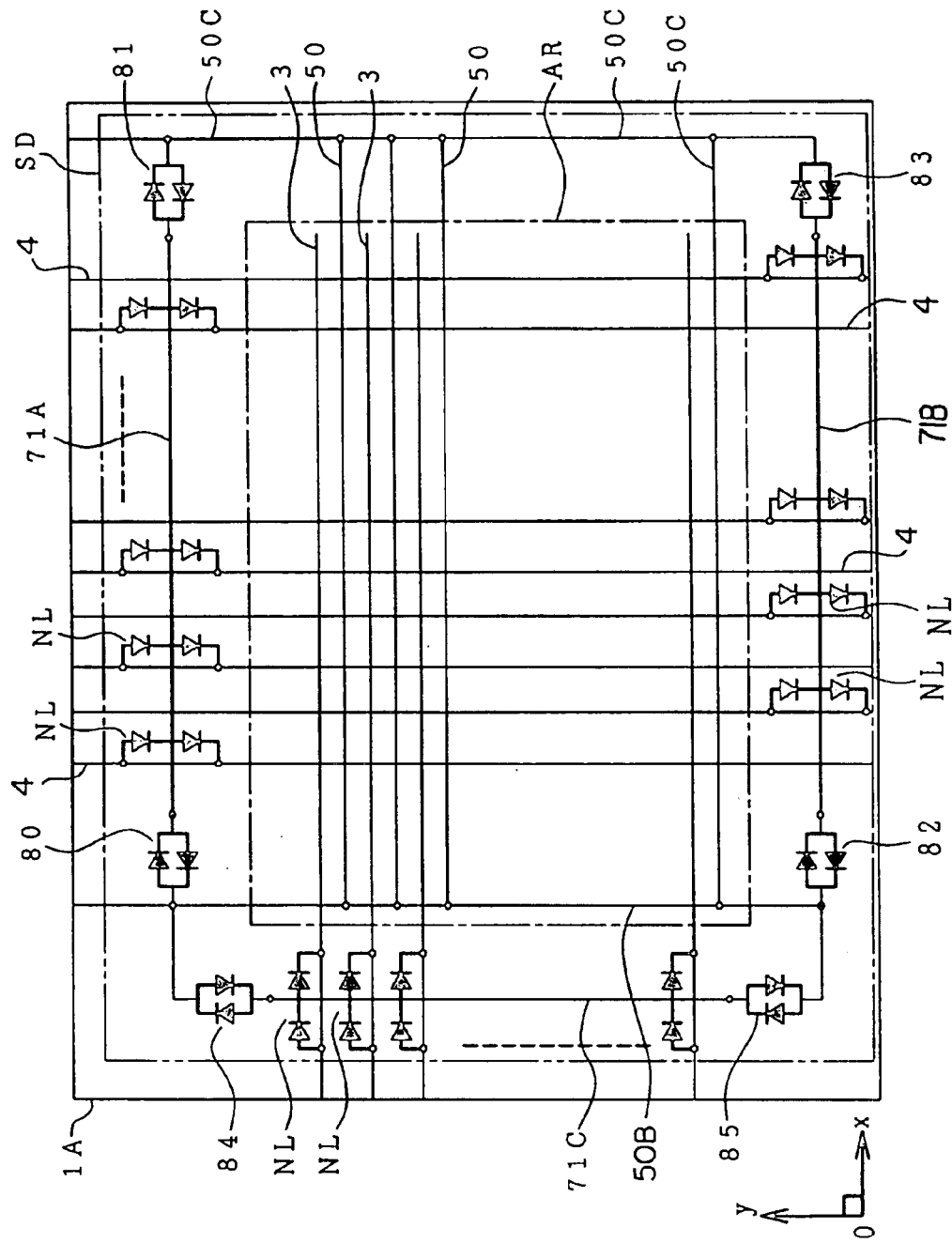
FIG. 1 is a diagram showing the essential construction of an embodiment of the liquid crystal display device according to the present invention.

FIG. 1 is a diagram showing one embodiment of a static protection circuit formed on the transparent substrate 1A. The static protection circuit shown in FIG. 1 is formed on the transparent substrate 1A in the area between a display area (denoted by symbol AR in FIG. 1) made up of an assembly of pixel areas and a shielding material (denoted by symbol SD in FIG. 1) for sealing a liquid crystal in the space between the matrix substrate 1A and the color filter substrate 1B.

Protection element common lines 71A and 71B are formed to intersect the video signal lines 4 above and below the display area, respectively. These protection element common lines 71A and 71B are formed of the same material as and by the same process as, for example, the scanning signal lines 3 and the counter signal lines 50. Accordingly, the protection element common lines 71A and 71B are formed to intersect the video signal lines 4 via the insulation film. Non-linear elements NL for providing connection between each of the protection element common lines 71A and 71B and the video signal lines 4 are formed at the intersections thereof as protection elements for preventing static damage. For example, the non-linear elements NL above the display area are arranged on odd-numbered video signal lines from the left as viewed in FIG. 1, while the non-linear elements NL below the display area are arranged on even-numbered video signal lines from the left. The reason why the arrangements of the non-linear elements NL differ between adjacent ones of the video signal lines 4 is that the video signal lines 4 and the scanning signal lines 3 can be smoothly inspected for disconnections or the like in the manufacturing process of the liquid crystal display device.

Each of the non-linear elements NL is made of, for example, two diodes, and one of the diodes is connected to the signal supply side of the video signal line 4 as an anode and to the protection element common line 71A (or 71B) as a cathode, while the other diode is connected to the protection element common line 71A (or 71B) as an anode and to the display area side of the video signal line 4 as a cathode. Each of the diodes is formed in parallel with the thin-film transistor TFT in each of the pixel areas, and has approximately the same construction as the thin-film transistor TFT except that the gate electrode and the source electrode are connected to each other.

Instead of the diodes, high-resistance elements which allow static electricity to flow therethrough may be used as the protection elements. Such high-resistance elements may be of the type in which interconnection lines are locally narrow in line width or interconnection lines are prolonged by being bent, or intrinsic semiconductors may also be used.

A protection element common line 71C is formed to intersect the scanning signal lines 3 on the left-hand side of the display area as viewed in FIG. 1 (on the signal supply side of the scanning signal lines 3). The protection element common line 71C is formed of the same material as and by the same process as, for example, the video signal lines 4. Accordingly, the protection element common line 71C is formed to intersect the scanning signal lines 3 via the insulation film. Non-linear elements NL are formed at the intersections of the protection element common line 71C and the scanning signal lines 3 as protection elements for providing connection between the protection element common line 71C and the scanning signal lines 3.

Each of the non-linear elements NL is made of, for example, two diodes, and one of the diodes is connected to the signal supply side of the scanning signal line 3 as an anode and to the protection element common line 71C as a cathode, while the other diode is connected to the protection element common line 71C as an anode and to the display area side of the scanning signal line 3 as a cathode. Each of the diodes is formed in parallel with the thin-film transistor TFT in each of the pixel areas, and has approximately the same construction as the thin-film transistor TFT except that the gate electrode and the source electrode are connected to each other.

Each of the counter signal lines 50, which are extended in the x direction and juxtaposed in the y direction in the display area, are connected to counter signal common lines 50B and 50C at its opposite ends. The counter signal common lines 50B and 50C are formed of the same material as and by the same process as the counter signal lines 50. The counter signal common lines 50B and 50C are respectively provided with signal supply terminals, and counter voltages are respectively applied from the signal supply terminals to the counter electrodes 50A in the pixel areas via the counter signal common lines 50B and 50C and the counter signal lines 50. In this manner, by supplying the counter voltages from the opposite sides of the counter signal lines 50, it is possible to supply signals to the counter electrodes 50A disposed in the respective pixel areas, without causing waveform distortions of the signals of the counter voltages. In this case, in applications of the present invention, it goes without saying that the counter voltage need not necessarily be supplied from the opposite sides of the counter signal lines 50, but may be supplied from either side of the counter signal lines 50.

Figure 4:
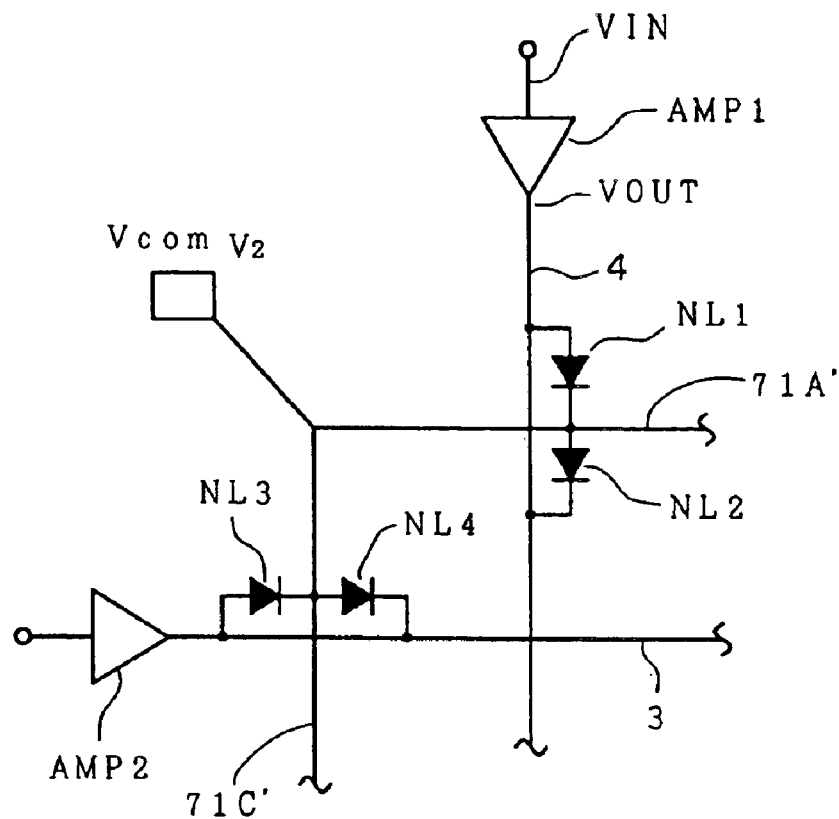
FIG. 4 is a schematic circuit diagram for use in describing problems.

A problem encountered when a counter signal is supplied to protection element common lines will be described below with reference to FIG. 4. FIG. 4 diagrammatically represents the relationship between protection element common line, video signal line, scanning signal line and protection element. In FIG. 4, for the sake of explanation of the problem, a protection element common line 71A' and a protection element common line 71C' are connected to each other via no high-resistance element. A voltage V2 of a counter signal is supplied from a terminal VCOM.

Non-linear elements NL1 and NL2 are disposed as protection elements between the protection element common line 71A' and the video signal line 4. An output circuit AMP1, which is a driving circuit, is connected to the video signal line 4 and, for example, a voltage VOUT1 is supplied to the video signal line 4 as a video signal. In addition, non-linear elements NL3 and NL4 are disposed as protection elements between the protection element common line 71C' and the scanning signal line 3. A driving circuit AMP2 is connected to the scanning signal line 3, and, for example, a voltage VOUT3 is supplied to the scanning signal line 3 as a scanning signal. Each of the non-linear elements NL1, NL2, NL3 and NL4 is formed by a diode in which the gate electrode and the source electrode of a thin-film transistor is connected to each other, and its ON resistance is approximately 10 MΩ.

Figure 5:
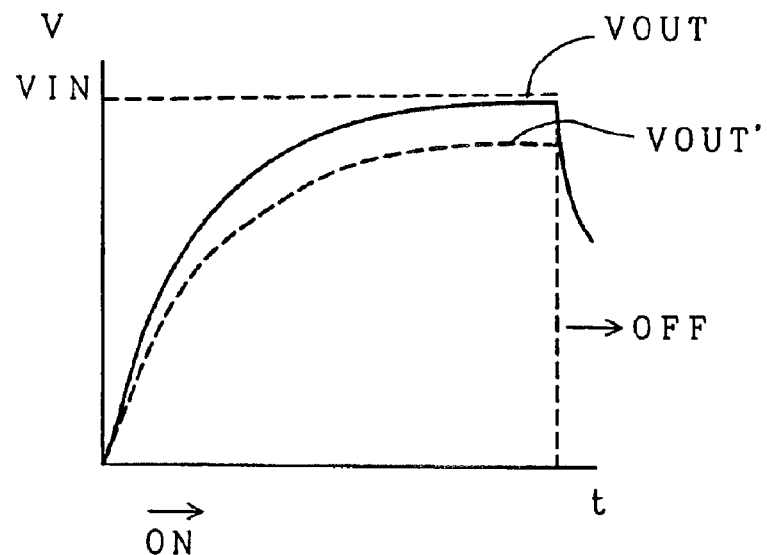
FIG. 5 is a graph showing the output voltage of an output circuit.

In general, the output circuit AMP1 is a buffer amplifier (voltage follower) which outputs a voltage equal to an input voltage VIN as an output voltage VOUT, but as shown in FIG. 5, the voltage VOUT changes to the input voltage VIN in a predetermined time owing to the capacitance of the video signal line 4 or the like. At this time, the output resistance value of the output circuit AMP1 changes from approximately 1 kΩ to approximately several MΩ. If the output resistance value of the output circuit AMP1 is approximately 1 kΩ, it can be neglected because it is significantly smaller than the ON resistance of any of the non-linear elements NL1, NL2, NL3 and NL4. However, if the output resistance value of the output circuit AMP1 changes to several MΩ, the ratio of the output resistance value to the ON resistance of any of the non-linear elements NL1, NL2, NL3 and NL4 becomes approximately 1:10 which causes a problem. For example, in FIG. 4, if the ON resistance of the non-linear element NL1 is 10 MΩ and the output resistance value of the output circuit AMP1 is 10 MΩ, a voltage VOUT', which is equivalent to a potential difference (VIN−VCOM)×(9/10) between a voltage V2 supplied from the terminal VCOM to the protection element common line 71A' and the input voltage VIN of the output circuit AMP1, is outputted to the video signal line 4.

To solve the above-described problem, the protection element common line 71A which is formed to intersect the video signal lines 4 is connected at its one end to the counter signal common line 50B via a high-resistance element 80, and at the other end to the counter signal common line 50C via a high-resistance element 81. The protection element common line 71B which is formed to intersect the video signal lines 4 is connected at its one end to the counter signal common line 50B via a high-resistance element 82, and at the other end to the counter signal common line 50C via a high-resistance element 83. Similarly, the protection element common line 71C which is formed to intersect the scanning signal lines 3 is connected at its one end to the counter signal common line 50B via a high-resistance element 84, and at the other end to the counter signal common line 50B via a high-resistance element 85.

In the static protection circuit which is constructed in the above-described manner, even if static electricity penetrates from the signal supply sides of the scanning signal lines 3, the video signal lines 4, and the counter signal common lines 50B and 50C, the static electricity is diffused into the protection element common lines 71A, 71B, 71C and the like via the non-linear elements NL, whereby the static electricity can be kept from penetrating the thin-film transistors TFT in the respective pixel areas. In addition, during the addressing of the liquid crystal display device, even if leakage current due to a video signal flows through any of the non-linear elements NL, this leakage current can be restrained from flowing through the counter signal common lines 50B and 50C by the high-resistance elements 80, 81, 82 and 83, so that it is possible to ameliorate the problem that the output voltages from the driving circuits are lowered. Similarly, even if leakage current due to a scanning signal flows through any of the non-linear elements NL, this leakage current can be prevented from flowing through the counter signal common line 50B by the high-resistance elements 84 and 85.

Each of the high-resistance elements 80, 81, 82, 83, 84 and 85 is made of, for example, two diodes which are connected in parallel and are opposed to each other in polarity, as shown in FIG. 1. In this case, each of the diodes is formed in parallel with the thin-film transistor TFT in each of the pixel areas, and has approximately the same construction as the thin-film transistor TFT except that the gate electrode and the source electrode are connected to each other. The high-resistance elements 80, 81, 82, 83, 84 and 85 may be of the type in which interconnection lines are locally narrow in line width or in which interconnection lines are extended in length by being bent, or intrinsic semiconductors may also be used.

As is apparent from the foregoing description, in accordance with the liquid crystal display device according to the present invention, it is possible to prevent static damage and it is also possible to avoid the occurrence of leakage current due to signals flowing from scanning signal lines or video signal lines to counter signal lines.

What is claimed is:

1. A liquid crystal display device comprising:
    a first substrate;
    a second substrate;
    a liquid crystal layer interposed between said first substrate and said second substrate;
    a plurality of video signal lines and scanning signal lines formed on said first substrate, and delimiting pixel regions;
    a thin film transistor formed in said pixel regions, and driven by a scanning signal from a scanning signal line for supplying video signal from one of the video signal lines to a pixel electrode;
    a display area containing a plurality of said pixel regions;
    a first protection element line formed at a peripheral portion of said display area, and being connected to odd-numbered one of said video signal lines by first high-resistance elements;
    a second protection element line formed at a peripheral portion of said display area, and being connected to even-numbered ones of said video signal lines by second high-resistance elements; and
    a common line electrically connected to said first and second protection element lines by third high-resistance elements.

2. A liquid crystal display device according to claim 1, wherein at least one of said first, second and third high-resistance elements have a gate electrode connected to a source electrode.

3. A liquid crystal display device according to claim 1, wherein at last one of said first, second and third high-resistance elements is formed by at least one diode in which a gate electrode and a source electrode of a thin-film transistor is connected to each other.

4. A liquid crystal display device according to claim 1, wherein said first, second and third high-resistance elements have a same configuration.

5. A liquid crystal display device comprising:
    a first substrate;
    a second substrate;
    a liquid crystal layer interposed between said first substrate and said second substrate;
    a plurality of video signal lines and scanning signal lines formed on said first substrate, and delimiting pixel regions;
    a thin film transistor formed in said pixel regions, and driven by a scanning signal from the scanning signal line for supplying video signal from one of the video signal lines to a pixel electrode;
    a display area containing a plurality of said pixel regions;
    a first protection element line formed at a peripheral portion of said display area, and being connected to odd-numbered ones of said video signal lines by first high-resistance elements;
    a second protection element line formed at peripheral portion of said display area, and being connected to even-numbered ones of said video signal lines by second high-resistance elements; and
    a common line electrically connected to said first and second protection element lines.

6. A liquid crystal display device according to claim 5, wherein at least one of said first and second high-resistance elements having a gate electrode connected to a source electrode.

7. A liquid crystal display device according to claim 5, wherein at least one of said first and second high-resistance elements is formed by at least one diode in which a gate electrode and a source electrode of a thin-film transistor is connected to each other.

8. A liquid crystal display device according to claim 5, wherein said first and second high-resistance elements have a same configuration.

* * * * *